(12) United States Patent
Bradley et al.

(10) Patent No.: US 7,832,770 B2
(45) Date of Patent: Nov. 16, 2010

(54) VEHICLE PASSENGER RESTRAINT SYSTEM

(75) Inventors: Scott Bradley, Jacksonville, FL (US); Bradley T. Elliott, Jacksonville, FL (US)

(73) Assignee: Intertek Industrial Corporation, Jacksonville, FL (US)

( * ) Notice: Subject to any disclaimer, the term of this patent is extended or adjusted under 35 U.S.C. 154(b) by 153 days.

(21) Appl. No.: 12/249,612

(22) Filed: Oct. 10, 2008

(65) Prior Publication Data
US 2010/0078252 A1 Apr. 1, 2010

Related U.S. Application Data

(60) Provisional application No. 61/101,882, filed on Oct. 1, 2008.

(51) Int. Cl.
*B60R 22/00* (2006.01)

(52) U.S. Cl. .................................................. 280/808

(58) Field of Classification Search .............. 280/801.1, 280/807, 808; 297/464, 465, 468, 484
See application file for complete search history.

(56) References Cited

U.S. PATENT DOCUMENTS

| | | | | |
|---|---|---|---|---|
| 3,620,569 A | * | 11/1971 | Mathis et al. | 297/478 |
| 3,887,233 A | * | 6/1975 | Garavaglia et al. | 297/478 |
| 4,099,770 A | * | 7/1978 | Elsholz et al. | 297/216.11 |
| 4,175,787 A | * | 11/1979 | Muskat | 297/484 |
| 4,632,425 A | * | 12/1986 | Barratt | 280/801.1 |
| 5,080,191 A | * | 1/1992 | Sanchez | 182/3 |
| 5,301,371 A | * | 4/1994 | Chao | 2/102 |
| 5,660,445 A | * | 8/1997 | Murray | 297/485 |
| 5,676,398 A | * | 10/1997 | Nurtsch | 280/806 |
| 5,970,587 A | * | 10/1999 | Knox | 24/633 |
| 6,637,547 B1 | * | 10/2003 | Wydner | 182/3 |
| 7,017,525 B2 | * | 3/2006 | Leach | 119/770 |
| 2003/0137180 A1 | * | 7/2003 | Rouhana et al. | 297/484 |
| 2008/0296884 A1 | * | 12/2008 | Rouhana et al. | 280/808 |

OTHER PUBLICATIONS

Wikipedia.org, "Seat Belts." Internet. Available at http://en.wikipedia.org/w/index.php?title=Seat_belt&oldid=241772454. Version dated Sep. 29, 2008.
IMMI, "Upper Torso Restraints." Internet. Available at http://www.imminet.com/commercial/products/off_uppertorsorestraint.htm. 2003.
Schroth Safety Products GMBH, "Product Catalog." Internet. Available at http://english.schroth.com/racing/kategorien.php?kat=1. 2009.
Schroth Safety Products GMBH, "Specification Sheet for General Aviation, #990071," Jul. 2003.

* cited by examiner

*Primary Examiner*—Paul N Dickson
*Assistant Examiner*—Robert A Coker
(74) *Attorney, Agent, or Firm*—Patentbest; Andrew McAleavey

(57) ABSTRACT

A vehicle passenger restraint system is disclosed. The restraint system has a pair of vertically extending shoulder strap portions, horizontally extending positioning strap portions attached to the shoulder strap portions, and horizontally extending lower strap portions spaced vertically below the positioning strap portions. The shoulder strap portions may be contiguous with one another, so as to form one continuously linked shoulder strap portion. The shoulder strap portions and positioning strap portions may be connected to retractors. The restraint system is particularly suitable for use in emergency vehicles such as ambulances, and may be used in forward-facing, rearward-facing or side-facing seating.

20 Claims, 3 Drawing Sheets

VEHICLE PASSENGER RESTRAINT SYSTEM

CROSS-REFERENCE TO RELATED APPLICATIONS

This application claims priority to, and the benefit of, U.S. Provisional Application No. 61/101,882, filed Oct. 1, 2008, the contents of which are incorporated by reference in their entirety.

BACKGROUND OF THE INVENTION

1. Field of the Invention

The invention relates to passenger restraint systems for vehicles.

2. Description of Related Art

Most modern vehicles have some form of seat restraint, sometimes called a seat belt, to restrain the occupants while the vehicle is moving. One of the most familiar forms of seat restraint is the lap belt, which is designed to be buckled around the pelvis. Another familiar type of restraint is the shoulder belt, which is found in at least the front seats of most modern passenger cars.

Seat restraint systems in conventional automobiles are relatively well established, and are the subject of extensive research, testing, and regulation in the United States and abroad. As the benefits of seat restraints in conventional passenger automobiles have become clear, and restraint technology itself has become well established, some attention has shifted to other types of vehicles.

Emergency vehicles, including ambulances, present particular challenges in restraining occupants. For example, during a patient transport in an ambulance, at least one emergency medical technician (EMT) usually sits in the back of the vehicle with the patient. Depending on the situation, an EMT may sit in a rearward-facing seat positioned, for example, at the head of the gurney to which the patient is secured, or he or she may sit in a side-facing seat or on a bench next to the patient. Restraining the EMTs in the back of the vehicle is a particular challenge for two main reasons: first, the restraints must provide the EMTs with enough mobility to administer medical care while the vehicle is in motion, and, second, comparatively little data is available regarding the performance of restraint systems in side-facing seats. What little is known about the performance of restraint systems in side-facing seats indicates that conventional restraints may be only partially effective.

SUMMARY OF THE INVENTION

Aspects of the invention relate to vehicle passenger restraint systems. One embodiment of a restraint system according to an aspect of the invention includes a pair of upwardly-extending shoulder strap portions, horizontally-extending positioning strap portions attached to the shoulder strap portions, and horizontally-extending lower strap portions spaced vertically below the positioning strap portions. In some embodiments, the shoulder strap portions may be contiguous with one another, so as to form one continuously linked shoulder strap portion. The shoulder strap portions and positioning strap portions may be connected to retractors. These restraint systems are particularly suitable for use in emergency vehicles such as ambulances, and may be used in forward-facing, rearward-facing or side-facing seating.

Another aspect of the invention relates to vehicles, such as emergency vehicles, with restraint systems such as those described above.

Other aspects, features, and advantages of the invention will be set forth in the description that follows.

BRIEF DESCRIPTION OF THE DRAWINGS

The invention will be described with respect to the following drawing figures, in which like numerals represent like elements throughout the drawings, and in which.

DETAILED DESCRIPTION

Figure 1:
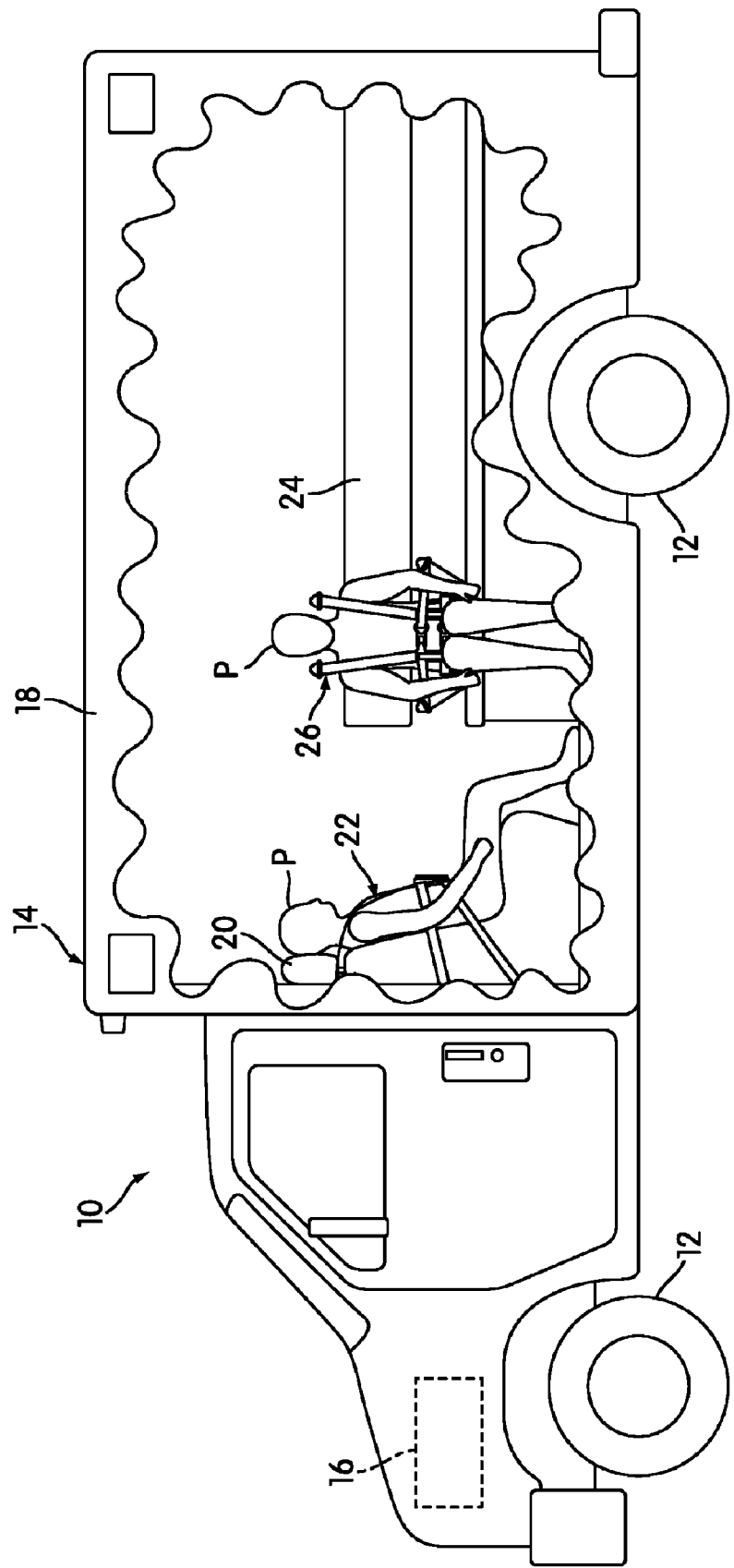
FIG. 1 is a schematic side elevational view of an emergency vehicle illustrating embodiments of a restraint system according to the present invention in use.

In the following description, terms such as "left," "right," "horizontal," and "vertical" will be used. Unless otherwise noted, these terms refer to the coordinate system of the drawing figures, i.e., "left" refers to the left portion of a drawing figure.

FIG. 1 is a schematic side elevational view of a vehicle, generally indicated at 10, according to an embodiment of the invention. In the illustrated embodiment of FIG. 1, the vehicle 10 is an emergency vehicle, and in particular, an ambulance, although embodiments of the invention may include or be used in any type of vehicle, including terrestrial vehicles, sea-based vehicles, and aerial vehicles. The emergency vehicle 10 of FIG. 1 includes a plurality of wheels 12, a body 14, and an engine 16, which drives the wheels 12.

In the illustration of FIG. 1, a side panel of the patient care compartment 18 of the emergency vehicle 10 is cut away to show its interior arrangement. Emergency vehicles may have many different configurations and interior arrangements, of which the emergency vehicle 10 of FIG. 1 is but one example. As shown, the emergency vehicle 10 includes a rearward-facing seat 20 that is typically arranged so as to be at the head of a patient gurney or stretcher (not shown in the figure). A passenger P, typically an Emergency Medical Technician (EMT) or another type of medical professional, is strapped into the rearward-facing seat 20 by a vehicle restraint system 22 according to one embodiment of the invention. The emergency vehicle 10 also includes side-facing bench seating 24 which may, in some embodiments, fold up when not in use. As shown in FIG. 1, a second passenger P, often another EMT, is strapped into the side-facing bench seating 24 with another vehicle restraint system 26. Although side-facing bench seating 24 is shown in FIG. 1, in other embodiments, the side facing seating could be an individual side-facing seat or a plurality of individual side-facing seats. Additionally, restraint systems 22 according to embodiments of the invention may be used for forward-facing seats.

The vehicle restraint systems 22, 26 shown in FIG. 1 may be the same or different, depending on a number of factors which will be described below. In general, the vehicle restraint systems 22, 26 are constructed and adapted to restrain a passenger in a vehicle while providing sufficient mobility to perform desired activities. For example, the vehicle restraint systems 22, 26 may provide enough mobility for the restrained passengers P to provide medical care.

Figure 2:
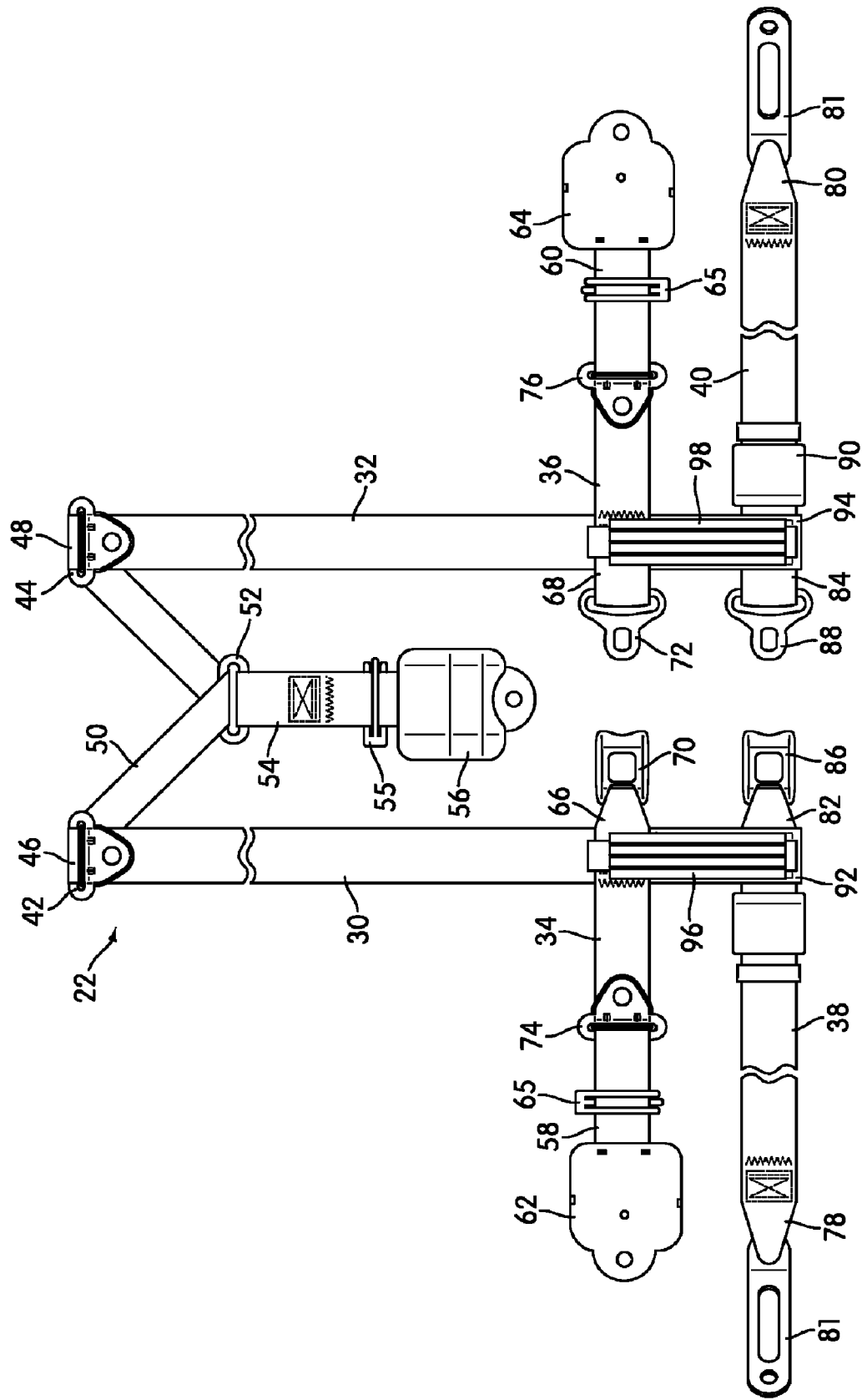
FIG. 2 is a front elevational view of one of the restraint systems of FIG. 1 in isolation.

FIG. 2 is a front elevational view of one of the vehicle restraint systems 22, 26 in isolation. (For purposes of the following description, the two vehicle restraint systems 22, 26 will be assumed to be the same.) The vehicle restraint system 22 is comprised of respective left and right shoulder strap portions 30, 32, left and right positioning strap portions 34, 36, and left and right lower strap portions 38, 40. The strap portions 30, 32, 34, 36, 38, 40 are typically formed of a thin, flexible material. Any material with sufficient strength to handle the typical applied loads may be used, and the term "strap," as used in this description, should be construed generally to refer to any flexible, elongate member capable of restraining a passenger, however constructed. For example, polyester web is one suitable material that may be used in some embodiments. In many cases, the material used for the strap portions 30, 32, 34, 36, 38, 40 may be chosen to meet governmental regulatory requirements, for example, the U.S. Federal Motor Vehicle Safety Standards (FMVSS). Generally speaking, the strap portions 30, 32, 34, 36, 38, 40 may be cut or otherwise formed from a single unitary piece of material, or they may be assembled from a plurality of individual elongate strips of material that are stitched, bonded, fused, or secured in some other manner, depending on the material that is used, the loads that are expected to be encountered, and any applicable regulatory standards. Methods of attaching and fixing the strap material together will be described in more detail below.

In the illustrated embodiment, the left and right shoulder strap portions 30, 32 are contiguous with one another and are made of a single length of strap material. A pair of strap guides 42, 44 (also called "D-rings") are spaced horizontally from one another and are adapted to be secured to the emergency vehicle 10 and to receive first ends 46, 48 of the respective left and right shoulder strap portions 30, 32. In general, strap guides establish and guide the path of the strap portions 30, 32, may prevent the strap portions from becoming tangled or fouled, and may provide additional points of attachment to the vehicle.

The left and right shoulder strap portions 30, 32 of the illustrated embodiment meet and are contiguous with one another in the space between the two strap guides 42, 44. As shown in FIG. 2, between the two strap guides 42, 44, the contiguous shoulder strap portion 50 passes through a connecting strap guide 52. The connecting strap guide 52 is attached to a connecting strap 54 which extends essentially vertically in the illustration of FIG. 1 and is attached to a retractor 56. The retractor 56 is itself adapted to be attached to the interior of the emergency vehicle 10 or other vehicle. Thus, the shoulder strap portions 30, 32 are indirectly attached to the emergency vehicle 10 through the connecting strap 54 and retractor 56.

The term "retractor" is a broad one, and a number of different types of retractors are suitable for use in embodiments of the invention. Suitable types of retractors include emergency locking retractors, which are sensitive to the speed at which the strap material comes off of the retractor spool, and will lock if the strap material comes off the spool too quickly, and so-called "dual sensitive" retractors, which combine the speed sensitivity of the emergency locking retractor with an angular sensor that responds both to the angular orientation of the vehicle and to acceleration or deceleration, such that the dual sensitive retractor will lock based on the speed at which material comes off the spool, based on the angular orientation of the vehicle, or based on rapid acceleration or deceleration of the vehicle. Both types of retractors provide a resilient force to bias the strap to which they are connected toward a retracted position in which a substantial portion of the length of the strap is spooled within the retractor. Generally speaking, any kind of retractor that locks in response to conditions indicative of a collision or other adverse event may be used in embodiments of the invention, and the term "emergency locking retractor" may be used in this description to refer to both types of retractors described above. In some embodiments, other types of retractors may be used with particular strap portions. For example, in some embodiments, automatic locking retractors, which lock whenever the user stops pulling the strap out of the retractor, may be used, particularly with the lower strap portions 38, 40.

The end of the connecting strap 54 lies within the retractor 56. If tension is applied to the shoulder strap portions 30, 32, that tension is transferred by the connecting strap guide 52 to the connecting strap 54, and the connecting strap 56 extends from the retractor, thus extending the effective length of the shoulder strap portions 30, 32. When tension is released or lessened, the resilient bias of the retractor 56 causes the connecting strap 54 to retract and draws the shoulder strap portions 30, 32 back toward their original positions. As shown in FIG. 2, limiting structure, such as a clip 55, may be installed on the connecting strap 54 proximate to the retractor 56 to limit the length of the connecting strap 54 that can enter the retractor 56. Clips such as clip 55 would typically be used during shipping and installation of the restraint system 22, and may be removed and discarded once the restraint system 22 is installed.

One advantage of the shoulder strap portions 30, 32 being contiguous is that tension or pulling on one of the shoulder strap portions 30, 32 increases tension on the other shoulder strap portion 30, 32. Thus, in some cases, the contiguous shoulder strap portions 30, 32 may minimize upper body rotation. Of course, the performance and response of the restraint system 22 in any particular situation will depend on the magnitude and direction of the applied loads, the positioning of the passenger, and a number of other factors, and the inventors do not wish to be bound by any particular theory.

The left and right positioning strap portions 34, 36 are adapted to be spaced vertically some distance below from the strap guides 42, 44, and extend generally horizontally. Respective first ends 58, 60 of the positioning strap portions 34, 36 are adapted to be connected to the emergency vehicle 10 or other vehicle. Specifically, each of the respective first ends 58, 60 is connected to and received in a retractor 62, 64, which is connected to the vehicle. The retractors 62, 64 may be the same as or different than the retractor 56 that is connected to the shoulder strap portions 30, 32 through the connecting strap 54. The second ends 66, 68 of the positioning strap portions 34, 36 are adapted to be releasably connected to one another. Specifically, the ends have respective cooperating engaging structures 70, 72 that secure the second ends 66, 68 (and thus, the left and right positioning strap portions 34, 36) together. In the illustrated embodiment, the cooperating engaging structures 70, 72 comprise a standard buckle with a buckle or receptacle portion 70 and a tongue portion 72 that engages the buckle portion 70. It should be understood that any sort of cooperating engaging structures may be used, including essentially any type of releasable buckle. It is particularly advantageous if the structures that are used are relatively easy for a passenger to engage and to disengage.

In the embodiment of FIG. 2, each positioning strap portion 34, 36 is adapted to be connected to the emergency vehicle 10 in two locations: first, the retractors 62, 64 are adapted to be connected to the interior of the emergency vehicle 10, and a pair of strap guides 74, 76 receive the respective positioning strap portions 34, 36. Each strap guide 74, 76 is also adapted to be connected to the emergency vehicle 10. As shown in FIG. 2, limiting structures such as clips 65 may be removably or fixedly attached to the positioning strap portions 34, 36 proximate to the retractors 62, 64 in order to limit the length of the positioning strap portions 34, 36 that can enter the retractors 62, 64. The clips 65 may be used only during shipping and prior to installation of the restraint system 22, and may be removed after installation.

Figure 3:
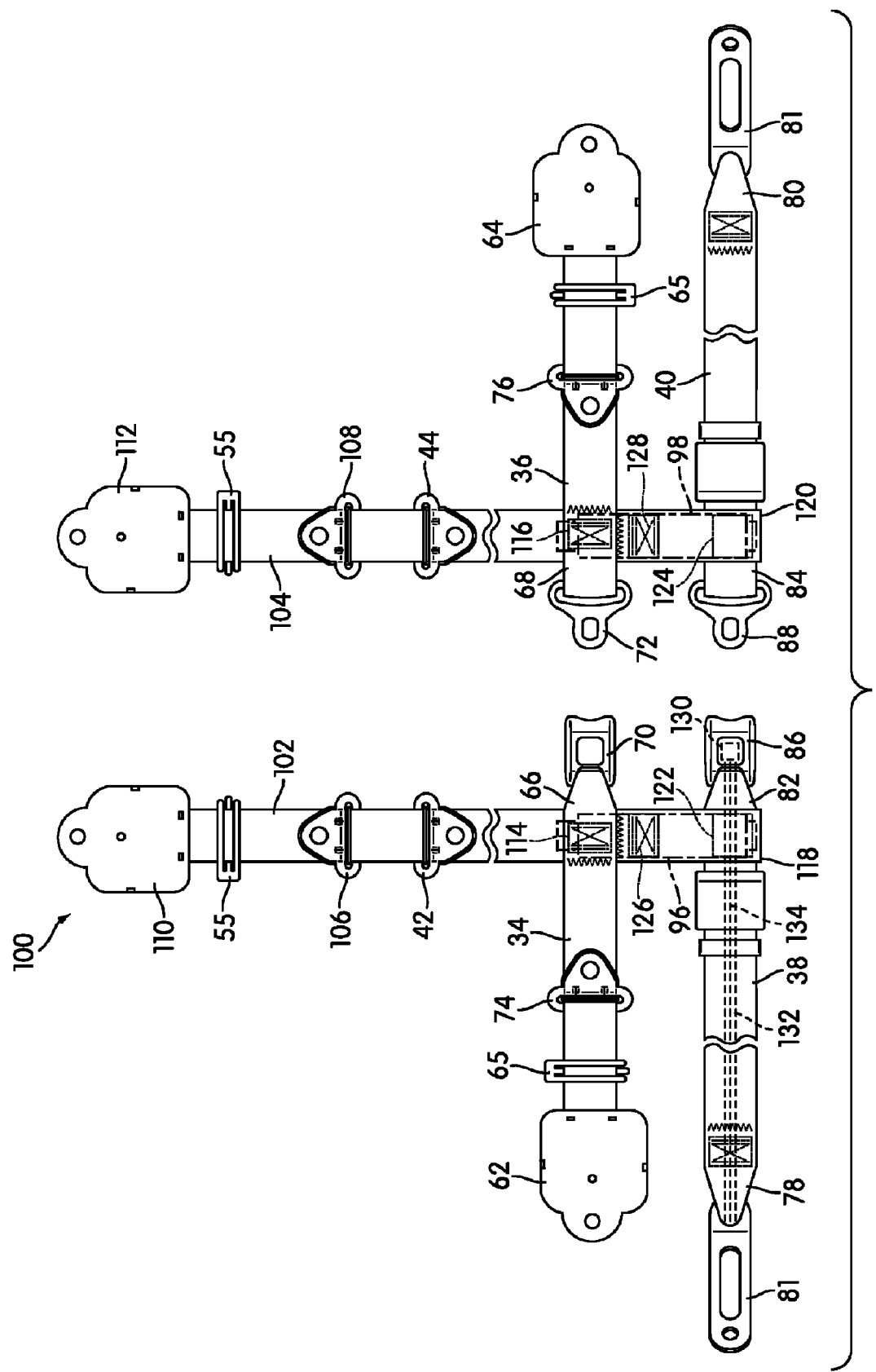
FIG. 3 is a front elevational view of another embodiment of a restraint system according to an embodiment of the invention.

Between the first and second ends of the positioning strap portions 34, 36, and generally proximate to the second ends 66, 68, the left and right shoulder portions 30, 32 meet the respective left and right positioning strap portions 34, 36 at generally perpendicular intersections at which the respective left 30, 34 and right 32, 36 straps are attached to one another. The attachment may be by any method described above; however, stitching the strap portions together is one efficient and effective way to attach them. The attachment points are best seen in FIG. 3 and the method of attachment will be described below with respect to that figure.

At a position vertically below the positioning strap portions 34, 36 are the lower strap portions 38, 40. Like the positioning strap portions 34, 36, the lower strap portions 38, 40 extend generally horizontally, and generally parallel to the positioning strap portions 34, 36, and have lower strap first ends 78, 80 that are adapted to be connected to the emergency vehicle 10, for example, with fittings 81 that are adapted to be bolted down, and second ends 82, 84 that have cooperating engaging structures 86, 88 adapted to be connected to one another. The cooperating engaging structures 86, 88 of the lower strap portions 34, 36 may be the same as or different than the corresponding structures 70, 72 of the positioning strap portions 34, 36. More specifically, if buckles are used for both the positioning strap portions 34, 36 and the lower strap portions 38, 40, in some embodiments, it may be advantageous to make the respective buckle portions distinctive, so as to reduce the possibility of confusion over which tongue portion inserts into which buckle portion. In particular embodiments, the buckle portions may be made so that they will not engage if an incorrect tongue portion is inserted.

In the illustrated embodiment of FIG. 2, the lower strap portions 38, 40 are not attached to retractors and do not have additional strap guides. The lower strap portions 38, 40 would generally serve the function of a standard lap belt, and retractors may not be necessary. However, if retractors are not used, some mechanism for adjusting the length of the strap portions 38, 40 is useful. As shown in FIG. 2, the left lower strap portion 38 includes an adjuster 90 within which the strap portion 38 is looped back over a fitting, such that the loose end can be pulled to tighten. In other embodiments, retractors and, if desired, strap guides may be used.

The shoulder strap portions 30, 32 also intersect and are attached to the lower strap portions 38, 40 at a generally perpendicular intersection, at which the shoulder strap portions 30, 32 terminate at respective second ends 92, 94. The attachment points are not shown in FIG. 2, are best seen in FIG. 3, and will be described below in more detail with respect to that figure. As with the positioning strap portions 34, 38, the shoulder strap portions 30, 32 may be attached to the lower strap portions 38, 40 by any means, with stitching being one effective means of attachment.

In some embodiments, features may be added to the strap portions 30, 32, 34, 36, 38, 40 to make them easier to grab and hold. In the embodiment of FIG. 2, a pair of gripping straps 96, 98 are attached and extend in a generally vertical orientation along the shoulder strap portions 30, 32. The gripping straps 96, 98 attach at roughly the same points that the shoulder strap portions 30, 32 attach to the positioning strap portions 34, 36 and the lower strap portions 38, 40. These gripping straps 96, 98 form a loop with one end attached to or near the point at which the shoulder strap portion 30, 32 attaches to the positioning strap portion 34, 36, and one end attached to or near the point at which the shoulder strap portion 30, 32 attaches to the lower strap portion 38, 40. The gripping straps 96, 98 are of sufficient length such that a passenger can slip a hand under them to grab, and may be rubberized, textured, contoured, thickened, or otherwise modified to facilitate gripping. For example, a rubber grip may be inserted over or threaded onto a length of web material.

In the above description, the various components of the restraint system 22 were described as being adapted to be connected to an emergency vehicle 10 or another vehicle. The precise details of installation will vary from embodiment to embodiment, vehicle to vehicle, and installation to installation. Depending on the embodiment, the vehicle, and the installation, the strap guides and retractors may be attached directly to vehicle structure, they may be attached to seat structure, or they may be attached to some combination of vehicle and seat structure.

In the installed configuration, the restraint system 22 may be sized and dimensioned to fit passengers of a range of sizes. Anthropometric data may be used to establish appropriate dimensions or ranges of dimensions. For example, in one embodiment, the restraint 22 may be dimensioned to fit any passenger from a $50^{th}$ percentile female to a $95^{th}$ percentile male. Different embodiments may have different dimensions or ranges of dimensions based on the particular installation or because of different intended passenger sizes.

As was noted briefly above, the lower strap portions 38, 40 act essentially as a lap belt, encircling the pelvis. In some embodiments, the positioning strap portions 34, 36 may be spaced from the lower strap portions 38, 40 by a vertical distance sufficient to allow them to encircle and secure the lower portion of the chest, for example, around the bottom of the rib cage. However, it should be understood that the restraint system 22 need not necessarily cross, cover, or encircle any particular anatomical structures or landmarks in order to be effective. Rather, the passenger may be positioned in the restraint system 22 in any way, so long as he or she generally cannot slip out. To that end, the positioning strap portions 34, 36 may prevent the passenger from slipping out of the restraint system 22 by keeping the shoulder strap portions 30, 32 in the proper position.

In one embodiment, for example, the lower strap portions 38, 40 and positioning strap portions 34, 36 may be spaced from each other by a vertical distance of about four to six inches (e.g. five inches). Other dimensions would depend on the particular vehicle in which the restraint system is to be installed and the range of passengers it is to accommodate. Generally, when installed, the connecting strap 54 and connecting strap guide 52 would be positioned behind the seat or bench around which the restraint system 22 is installed, and may be secured at any vertical position behind the seat or bench, so long as sufficient strap material is provided.

In some vehicles, it may be difficult to attach the connecting strap guide 52, the connecting strap 54, and its retractor 56 behind the seating area served by the restraint system 22. One vehicle in which that may be difficult is the Type II ambulance, which has a van body with curved sidewalls to which it may be difficult to attach components. Therefore, some embodiments of the invention may attach to the floor of the vehicle, or to any other structure that has sufficient strength to handle the applied loads.

FIG. 3 is a front elevational view of another embodiment of a vehicle restraint system, generally indicated at 100. The vehicle restraint system 100 is similar in many respects to the vehicle restraint systems 22, 26 described above. Therefore, where a component is not specifically described as being different in the description that follows, it may be assumed to be the same as, or substantially similar to, the components described above.

In the restraint system 100 of FIG. 3, the left and right shoulder portions 102, 104 are not contiguous with one another. Instead, they remain separate over their entire lengths. Each of the shoulder strap portions 102, 104 is received in a first strap guide 42, 44, that is adapted to be attached to a vehicle just above the seating area served by the restraint system 100. However, the two strap portions 102, 104 remain separate, and each strap portion 102, 104 passes through a second strap guide 106, 108 before being received in a retractor 110, 112. As with the restraint system 22, limiting structure, such as clips 55, may be removably or fixedly installed proximate to the retractors 110, 112 to limit the length of the strap portions 102, 104 that can enter the retractors 110, 112.

In a typical installation, the shoulder strap portions 102, 104 would pass downwardly from the first strap guides 42, 44 and the second strap guides 106, 108 and the retractors 110, 112 would be attached to or proximate to the floor, to or proximate to the bench seating 24, or to any other structure capable of handling the applied loads. This type of mounting may be easier to implement in some types of vehicles, and may be particularly advantageous to use in Type II ambulances when the restraint system 100 is to serve a side-facing seat and would otherwise need to be attached to curved sidewalls. Other methods and arrangements for installing vehicle restraint systems 22, 26, 100 according to embodiments of the invention will be apparent to those of skill in the art, and any type of installation may be used.

Below the first strap guides 42, 44, the arrangement of the shoulder strap portions 100, 102 is substantially similar to the arrangement of the shoulder strap portions 30, 32 of the restraint system 22 that is described above: the shoulder strap portions 100, 102 are attached to the positioning strap portions 34, 36 and the lower strap portions 38, 40, respectively, at generally perpendicular intersections.

In the view of FIG. 3, the gripping straps 96, 98 are shown in phantom in order to illustrate the stitching that connects the strap portions together. Although the stitching and mode of attachment will be described below with respect to restraint system 100, the mode of attachment may be assumed to be similar in the restraint systems 22, 26 described above with respect to FIG. 2.

The left and right positioning strap portions 34, 36 loop over fittings on the buckle 70 and tongue portion 72. In order to attach to the shoulder strap portions 102, 104, the portions of the positioning strap second ends 66, 68 that exit the buckle 70 and tongue portion 72 are doubled over the portions that enter the buckle 70 and tongue 72 with the webbing of the respective shoulder strap portions 102, 104 sandwiched between the doubled over plies of the positioning strap portions 34, 36. This three-ply arrangement is then sewn with box and cross stitch and zig-zag stitching patterns 114, 116 to secure the strap portions together.

The attachment of the shoulder strap portions 102, 104 and the lower strap portions 38, 40 is somewhat different. At their second ends 118, 120, the shoulder strap portions 102, 104 are doubled back under themselves, and the webbing of the respective second ends 82, 84 of the lower strap portions 38, 40 passes through the loops created by the doubling over of the shoulder strap portions 102, 104. Box stitching 122, 124 is used to secure the three plies of webbing together. In the embodiment of FIG. 3, a cross stitch is not used within the box stitching 122, 124, although it could be in other embodiments. Above the second ends 118, 120, the doubled over material of the shoulder straps 102, 104 is sewn to itself with box and cross stitch and zig-zag stitching patterns 126, 128 to complete and secure the loops through which the lower strap portions 38, 40 pass.

Vehicle restraint systems 22, 26, 100 according to embodiments of the invention may optionally be used with sensor systems that detect when a passenger has correctly engaged them and/or is wearing them properly. For example, the cooperating engaging structures 70, 72, 86, 88 could be fitted with sensors that detect when they are engaged with one another, and could notify the vehicle operator when that occurs. Additional sensors, such as pressure sensors installed in the seating areas, may also be included in such as system. In one embodiment, as shown in FIG. 3, a sensor 130 may be placed in the buckle portion 86 of the left lower strap portion 38. A conduit 132 may be sewn to one face of the left lower strap portion 38 to carry the wire or wires 134 from the sensor to a controller located within the body of the emergency vehicle 10. A pressure sensor may be located in the seat itself, or may be coupled to the seat in such a way as to determine when the seat is occupied. A panel with an output mechanism, such as indicator lights, could inform the driver of the vehicle when a passenger is in a seat with his or her restraint system 22, 26, 100 engaged.

While the invention has been described with respect to certain embodiments, the embodiments are intended to be exemplary, rather than limiting. Modifications and changes may be made within the scope of the invention, which is defined by the appended claims.

What is claimed is:

1. A vehicle restraint system, comprising:
left and right flexible, generally upwardly-extending strap portions, each of the strap portions having first ends adapted to be attached to the interior of a vehicle;
respective flexible right and left positioning strap portions oriented substantially perpendicular to the pair of upwardly-extending strap portions, the left and right positioning strap portions crossing and being fixedly attached to the left and right upwardly-extending strap portions, respectively, the left and right positioning strap portions having first positioning strap ends adapted to be attached to the vehicle and second positioning strap ends adapted to be releasably connected to one another, wherein the first positioning strap ends of the positioning strap portions are attached to respective retractors; and
respective flexible right and left lower strap portions oriented substantially parallel to the positioning strap portions, the left and right lower strap portions crossing and being fixedly attached to the left and right upwardly-extending strap portions, respectively, the left and right lower strap portions having lower strap first ends adapted to be attached to the vehicle and lower strap second ends adapted to be attached to one another, the lower strap portions being spaced from the positioning strap portions by a defined distance along the upwardly-extending strap portions.

2. The vehicle restraint system of claim 1, wherein the first ends of the upwardly-extending strap portions are upper ends.

3. The vehicle restraint system of claim 2, wherein the upper ends of the right and left upwardly-extending strap portions are continuous with one another, such that the left and right upwardly-extending strap portions are joined at the upper ends.

4. The vehicle restraint system of claim 3, further comprising first and second upper strap guides spaced horizontally from one another and adapted to be connected to the interior of the vehicle, the first and second upper strap guides receiving the left and right upwardly-extending strap portions, respectively.

5. The vehicle restraint system of claim 4, further comprising a connecting strap guide positioned horizontally between the first and second upper strap guides, the connecting strap guide being adapted to be connected to the vehicle and receiving the joined upper ends of the upwardly-extending strap portions.

6. The vehicle restraint system of claim 5, further comprising a retractor connected to the vehicle and coupled to the connecting strap guide.

7. The vehicle restraint system of claim 6, wherein the retractor is an emergency locking retractor.

8. The vehicle restraint system of claim 1, wherein the positioning strap second ends comprise respective cooperating buckle structures.

9. The vehicle restraint system of claim 8, wherein the lower strap second ends comprise respective cooperating buckle structures.

10. The vehicle restraint system of claim 9, wherein the cooperating buckle structures of the positioning strap second ends and the cooperating buckle structures of the lower strap second ends are adapted such that they do not interengage.

11. The vehicle restraint system of claim 9, further comprising a sensor attached to one or both of the cooperating buckle structures of the positioning strap second ends or the cooperating buckle structures of the lower strap second ends, the sensor being constructed and adapted to establish an electrical signal when the cooperating buckle structures of the positioning strap second ends or the lower strap second ends are engaged.

12. The vehicle restraint system of claim 1, wherein the retractors are emergency locking retractors.

13. The vehicle restraint system of claim 1, wherein one or both of the lower strap portions is adjustable in length.

14. The vehicle restraint system of claim 1, wherein the upwardly-extending strap portions terminate essentially at the points where the lower strap portions are fixedly attached.

15. The vehicle restraint system of claim 1, further comprising gripping portions attached along the length of the upwardly-extending strap portions between the positioning strap portions and the lower strap portions.

16. A vehicle comprising:
 a vehicle body;
 a passenger compartment within or attached to the body;
 at least one seating area within the passenger compartment; and
 a restraint system installed proximate to the seating area so as to secure a passenger in the seating area, the restraint system including
  left and right flexible, generally upwardly-extending strap portions, each of the strap portions having first ends adapted to be attached to the interior of the patient compartment,
  respective flexible right and left positioning strap portions oriented substantially perpendicular to the pair of upwardly-extending strap portions, the left and right positioning strap portions crossing and being fixedly attached to the left and right upwardly-extending strap portions, respectively, the left and right positioning strap portions having first positioning strap ends adapted to be attached to the patient compartment and second positioning strap ends adapted to be releasably connected to one another, wherein the first positioning strap ends of the positioning strap portions are attached to respective retractors, and
  respective flexible right and left lower strap portions oriented substantially parallel to the positioning strap portions, the left and right lower strap portions crossing and being fixedly attached to the left and right upwardly-extending strap portions, respectively, the left and right lower strap portions having lower strap first ends adapted to be attached to the patient compartment and lower strap second ends adapted to be attached to one another, the lower strap portions being spaced from the positioning strap portions by a defined distance along the upwardly-extending strap portions.

17. The vehicle of claim 16, wherein the vehicle is an emergency vehicle.

18. The vehicle of claim 17, wherein the emergency vehicle is an ambulance.

19. A method for restraining a passenger, comprising:
 securing the passenger in a sitting position within a seating area using a restraint system, the restraint system including:
  left and right flexible, generally upwardly-extending strap portions, each of the strap portions having first ends adapted to be attached to the interior of the patient compartment,
  respective flexible right and left positioning strap portions oriented substantially perpendicular to the pair of upwardly-extending strap portions, the left and right positioning strap portions crossing and being fixedly attached to the left and right upwardly-extending strap portions, respectively, the left and right positioning strap portions having first positioning strap ends adapted to be attached to the patient compartment and second positioning strap ends adapted to be releasably connected to one another, wherein the first positioning strap ends of the positioning strap portions are attached to respective retractors, and
  respective flexible right and left lower strap portions oriented substantially parallel to the positioning strap portions, the left and right lower strap portions crossing and being fixedly attached to the left and right upwardly-extending strap portions, respectively, the left and right lower strap portions having lower strap first ends adapted to be attached to the patient compartment and lower strap second ends adapted to be attached to one another, the lower strap portions being spaced from the positioning strap portions by a defined distance along the upwardly-extending strap portions.

20. The method of claim 19, wherein the passenger is secured in a side-facing position using the restraint system.

* * * * *